United States Patent [19]

Iannadrea

[11] Patent Number: 5,319,576
[45] Date of Patent: Jun. 7, 1994

[54] WIRELESS DATA GATHERING SYSTEM FOR MOLTEN METAL PROCESSING

[75] Inventor: Gerald Iannadrea, Painesville, Ohio

[73] Assignee: General Signal Corporation, Stamford, Conn.

[21] Appl. No.: 82,020

[22] Filed: Aug. 5, 1987

[51] Int. Cl.$^5$ .................... G08C 19/12; G08C 19/16
[52] U.S. Cl. .................... 364/557; 340/870.17
[58] Field of Search .................... 364/496, 497, 557; 340/825.07, 870.13, 870.17; 374/140

[56] References Cited

U.S. PATENT DOCUMENTS

| | | | |
|---|---|---|---|
| 3,681,972 | 8/1972 | Mahanty et al. | 374/140 X |
| 3,915,002 | 10/1975 | Manie et al. | 73/354 |
| 4,133,036 | 1/1979 | Watson | 364/557 X |
| 4,194,177 | 3/1980 | Adamson | 340/870.13 |
| 4,223,549 | 9/1980 | Kitzinger | 340/140 |
| 4,459,584 | 7/1984 | Clarkson | 340/539 X |
| 4,468,655 | 8/1984 | Iwata | 340/870.13 X |
| 4,481,503 | 11/1984 | Lehman et al. | 340/870.13 X |
| 4,517,562 | 5/1985 | Martinez | 340/825.07 |
| 4,550,312 | 10/1985 | Galloway | 340/539 |
| 4,599,745 | 7/1986 | Baran et al. | 340/870.13 X |
| 4,622,538 | 11/1986 | Whynacht et al. | 340/539 |
| 4,716,411 | 12/1987 | Nakamura | 340/870.14 |
| 4,737,770 | 4/1988 | Brunius et al. | 340/539 |
| 4,831,558 | 5/1989 | Shoup et al. | 340/825.07 X |
| 4,943,930 | 7/1990 | Radjy | 364/506 |
| 4,986,670 | 1/1991 | Uchiyama et al. | 374/117 |

Primary Examiner—Thomas G. Black
Assistant Examiner—Michael Zawelli
Attorney, Agent, or Firm—Robert R. Hubbard; William G. Miller

[57] ABSTRACT

A system for obtaining real time measurements of at least one variable, such as temperature, of a molten metal bath where the variable is measured by immersion of an expendable primary element. The system includes a data transmitting assembly which receives the output of the primary element and when that output is within a predetermined range, indicating a valid reading, transmits a digital radio signal indicative of the magnitude of the variable. A data receiving assembly operates to receive the transmitted radio signal and a display device responsive to the output of the receiving device displays the magnitude of the variable.

4 Claims, 4 Drawing Sheets

WIRELESS DATA GATHERING SYSTEM FOR MOLTEN METAL PROCESSING

BACKGROUND OF THE INVENTION

This invention relates to data gathering systems for obtaining real time measurements of a number of different variables normally measured in molten metal processes, such as the steel making process. These variables include the temperature of the steel, its carbon content, its oxygen content, its aluminum content; as well as the manganese, magnesium and silicon content and the carbon equivalent. Measurements of this type, in molten metal baths, in industrial surroundings, have been made for a number of years using hard wired connections between the primary element or sensor which detects the magnitude of the variable being measured and the instrument being used to display or record the magnitude of the variable.

Typical of such measurements is the measurement of temperature in molten steel by the use of platinum thermocouples mounted at the end of a lance which serves to immerse the thermocouple either manually or automatically into the molten steel. Such thermocouples are usually housed in a protecting case which melts upon immersion to allow exposure of the couple to the molten steel so that the couple will develop an output potential which is directly related to the temperature of the steel. When the primary element is a thermocouple, the connection to the indicating or recording instrument is usually by way of compensating leadwire, as is well known in the thermocouple art.

In many molten metal applications where it is desired to make measurements by automatically immersing sensors into the molten metal, the use of hard wired connections becomes a source of many problems. Workers working at sites using such automatic systems have found that they occasionally trip on the wires and that the wires become damaged to such an extent that they miss important readings. In addition to the disadvantage occasioned by the missed readings, there is added disadvantage which results from the maintenance required to repair the damaged wires. In those applications where it may not be necessary to use an automatically operated lance for immersion hard wired connections are still found to be an inconvenience in operating such a device.

It is an object of this invention to provide a data gathering system which will allow the indicating and recording of the magnitude of both a single variable as well as a plurality of variables in molten metal processes in such a way as to avoid the inconvenience and costly maintenance involved in hard wired systems such as have been used in the past.

SUMMARY OF THE INVENTION

In carrying out the objects of the invention there is provided a data gathering system for obtaining real time measurements of variables in molten metal processing. This system utilizes a data transmitting assembly receiving inputs from sensors operable to detect the magnitude of the variables, an analog to digital converter connected to the output of the sensor for converting the detected values of the variables to a digital form, a microprocessor for processing the measurement, an FM VHF transmitter and a modulator responsive to the output of the microprocessor which will modulate the the transmitter in accordance with the that output. A data receiving assembly is also included. This assembly has an FM VHF receiver which responds to signals from said transmitter to produce an output signal corresponding to the modulated output of the transmitter, a demodulator responsive to the output of the receiver to produce demodulated signals having magnitudes indicative of the magnitudes of the variables, and display or recording device for exhibiting the magnitudes of the variables.

BRIEF DESCRIPTION OF THE DRAWINGS

In the drawings, in which like reference characters identify like elements.

DESCRIPTION OF THE PREFERRED EMBODIMENT

Figure 1:
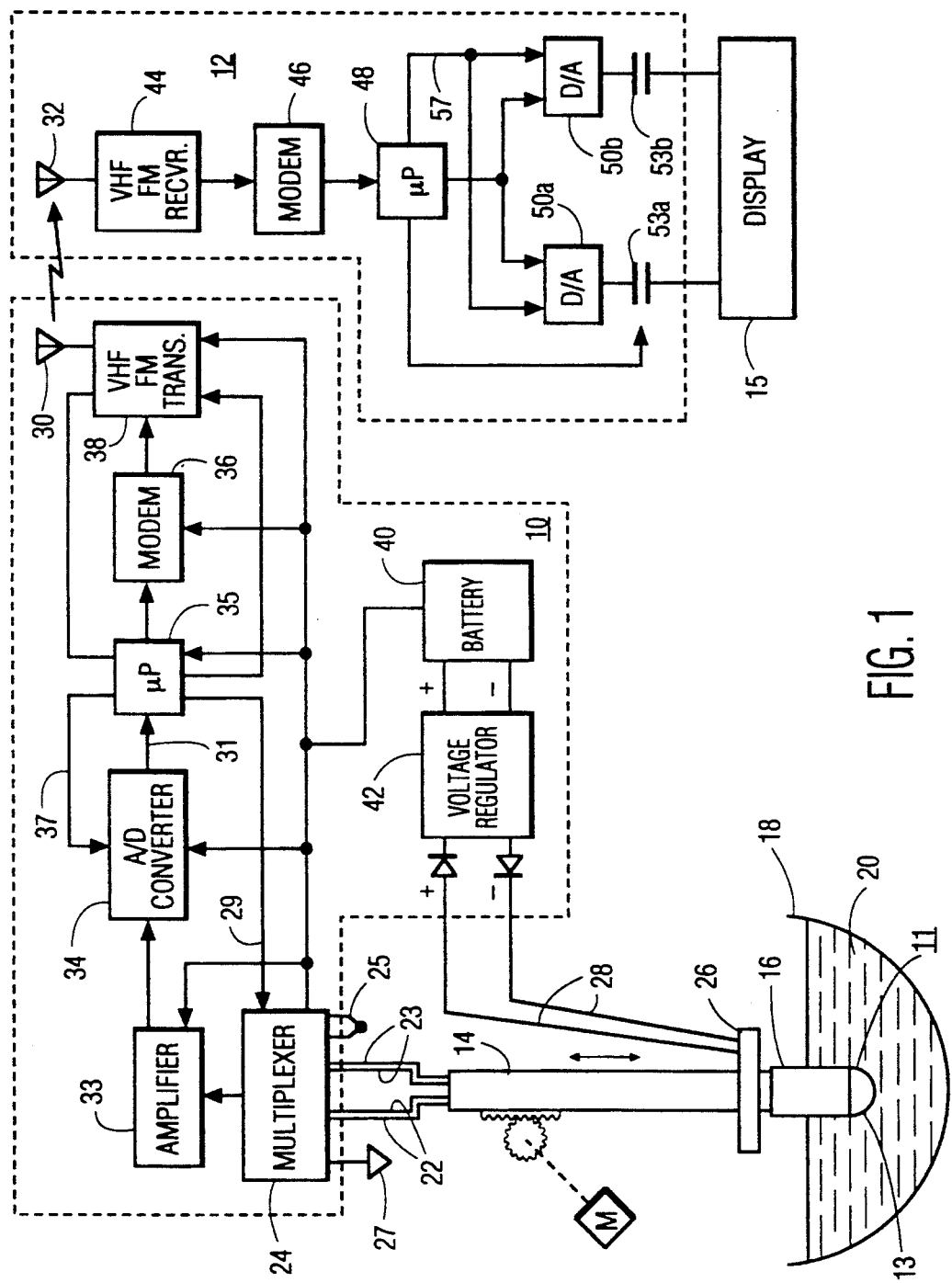
FIG. 1 is a block diagram showing one possible arrangement of the elements of the invention as it is applied to measurements in molten metal.

In FIG. 1 there is illustrated one version of the present invention, which utilizes radio transmission techniques for transmitting from a transmitting assembly 10 having any number of inputs, such as a single temperature sensor or data set or a plurality of sensors. The sensors or data sets are designated by the reference character 11 and are immersed in molten metal to supply signals for transmission to a receiving assembly 12, which outputs the received signals to a display 15 so that the magnitudes detected by the sensors are displayed on an indicating and recording device, such as the device 15. The sensor unit 11 is shown as having a protective cap 13 covering its primary elements, which may typically include the hot junctions of a thermocouple. The sensor with its primary elements is located and mounted at the end of a lance, shown in the form of a pipe 14. Sensors for service in the measurement of variables in molten metal baths are typically of the expendable type and are designed to plug into associated leadwire at the end of the lance. The sensor unit 11 is shown as including a protection tube in the form of a cardboard tube 16, as is normally used with immersion thermocouples and other immersible sensors.

In FIG. 1, the sensor unit 11 is shown inserted into a container 18 for the purpose of detecting the temperature or other variable of the molten metal 20 in the container. The sensor unit 11 may, for example, have two thermocouples and may be of the type shown and described as FIG. 2 of U.S. Pat. No. 3,915,002, issued to Hance et al., on Oct. 28, 1975, and known commercially as a Taptip unit by its manufacturer Leeds & Northrup Co. This unit is capable of measuring the temperature of the molten steel with one thermocouple and determining the % carbon from readings made with another thermocouple placed in a sample chamber in the sensor, where a sample of the molten metal is obtained arid frozen.

The sensor unit 11 in FIG. 1 is immersed into the molten metal by an automatically operated lance 14 which is moved up and down by means of a rack and pinion mechanism shown as operated by the motor M. Thus, for example, if the container 18 represents a basic oxygen furnace, a lance such as lance 14 may be automatically operated to obtain temperature and other measurements whenever they are desired. The lance 14 would ordinarily be a subsidiary lance to the lance used to blow the heat in such a BOF unit.

As is normally the case in thermocouple measurements for determining the temperature, compensating leadwires for connecting the thermocouple to a measuring instrument, such as the wires 22 and 23, are connected to carry the output of the thermocouples through the lance to the the transmitting assembly 10 of the system. The circuitry contained in the transmitting assembly 10 also receives input from a thermopile unit 26 by way of a leads 28.

In order to completely avoid the use of wires, it is necessary not only to transmit the data concerning the measurement to the display instrument by radio transmission, but it is also necessary to use batteries as a source of power for the circuitry of the transmitting assemby to completely avoid the need for wires in the lance area. In many uses of this type of equipment the normal periodic replacement of such batteries would be inconvenient. Therefore, a battery charging unit is supplied. This unit is part of the transmitting assembly 10 and is supplied with power by the thermopile unit 26 through diodes placed in the leads 28 to prevent the thermopile from draining the battery when the output of the thermopile is low. The thermopile is positioned for exposure to the heat radiated from the molten metal so that it will generate the needed current for recharging the battery 40 through the voltage regulator 42.

As shown in FIG. 1, the transmitting assembly transmits from its antenna 30 to the antenna 32 of the receiving assembly 12. In FIG. 1 the receiving assembly connects to an analog indicator and recorder such as the display device 15. The display device can also be a digital device if desired.

The Two pairs of leads 22 and 23 connect the primary elements in sensor unit 11 with the multiplexer 24 in the transmitter assembly 10. The multiplexer also has one input connected to a thermocouple 25, which measures the ambient temperature, and a ground connection 27. The multiplexer is designed to sequence through the four inputs during each measurement period as determined by the signal on line 29 from the microprocessor 35. The sampling periods for the making of measurements are timed to occur when the transmitter 38 is not transmitting so that noise from such transmissions will not be induced into the inputs to the multiplexer. The ground connection is for the purpose of measuring the potential on the ground terminal 27, which under the conditions of this type of installation may not be zero volts. Also, the ambient temperature measurement is made in order to be able to provide compensation for the cold junction temperature of the thermocouples in unit 11. The potential on the ground terminal and the potential across the thermocouple 25 are introduced into calculation of the quantities being measured in the microprocessor 35.

The inputs to the transmitter assembly as scanned by the multiplexer are amplified by the amplifier 33 and fed into the A/D converter 34 for conversion to digital form for transmission. The A/D converter is timed by the signals appearing on line 37 from the microprocessor. The converted signals are then supplied to the microprocessor by way of line 31 so that the microprocessor may make any necessary calculations with the information obtained from the ground connection and the ambient temperature measurement and can add to the bits of the digital form of the detected primary element signal identifying bits which will identify the primary element being sampled. Also, the microprocessor may be utilized to average the readings obtained over a period of time to effect a filtering of the inputs.

The output of the microprocessor 35 is fed to the modem 36 which modulates the VHF signal of the transmitter 38. Typically, the digital signal outputted from the modem causes the transmitter to transmit either of two frequencies representing the 1's and 0's of the digital signals which represent the measurements as processed by the microprocessor.

The transmitted signal is received by the receiving assembly 12 at antenna 32 of a receiver 44. The output of the receiver is demodulated by the modem 46 to provide the input to the microprocessor 48 which is available to process the data and make any necessary calculations. Mainly, the microprocessor 48 is useful to time the operation of the digital-to-analog, D/A, converters, shown as 50a and 50b by way of the signal on line 57. The outputs of the D/A converters 50a and 50b each of which handles one of the two variables measured by the sensors 11 are permitted to go to the display inputs or not depending on the state of the relay contacts 53a and 53b which are useful to avoid connecting signals to the display until those signals are valid signals.

The display unit 15 has two inputs for the two variables which are being measured. The two variables, as mentioned, may be the temperature of the bath and the temperature of the sample captured by the sensor unit 11, which will be interpreted later in terms of % carbon. The display unit, which may be a Steelab unit, as manufactured by Leeds & Northrup Co., is provided with circuitry which will identify the nature of the particular inputs so as to properly display the results of the associated measurements. For example, the display unit will follow the cooling curve of the temperature in the sample taken by one of the thermocouples in the immersion unit 11 to determine if a proper liquidus arrest is obtained; and, if so, the display unit will calculate the % carbon from that liquidus arrest. Other primary elements may, of course, be utilized in sensor 11. Such primary elements may include a dissolved oxygen detector and a phase change detector.

Figure 2:
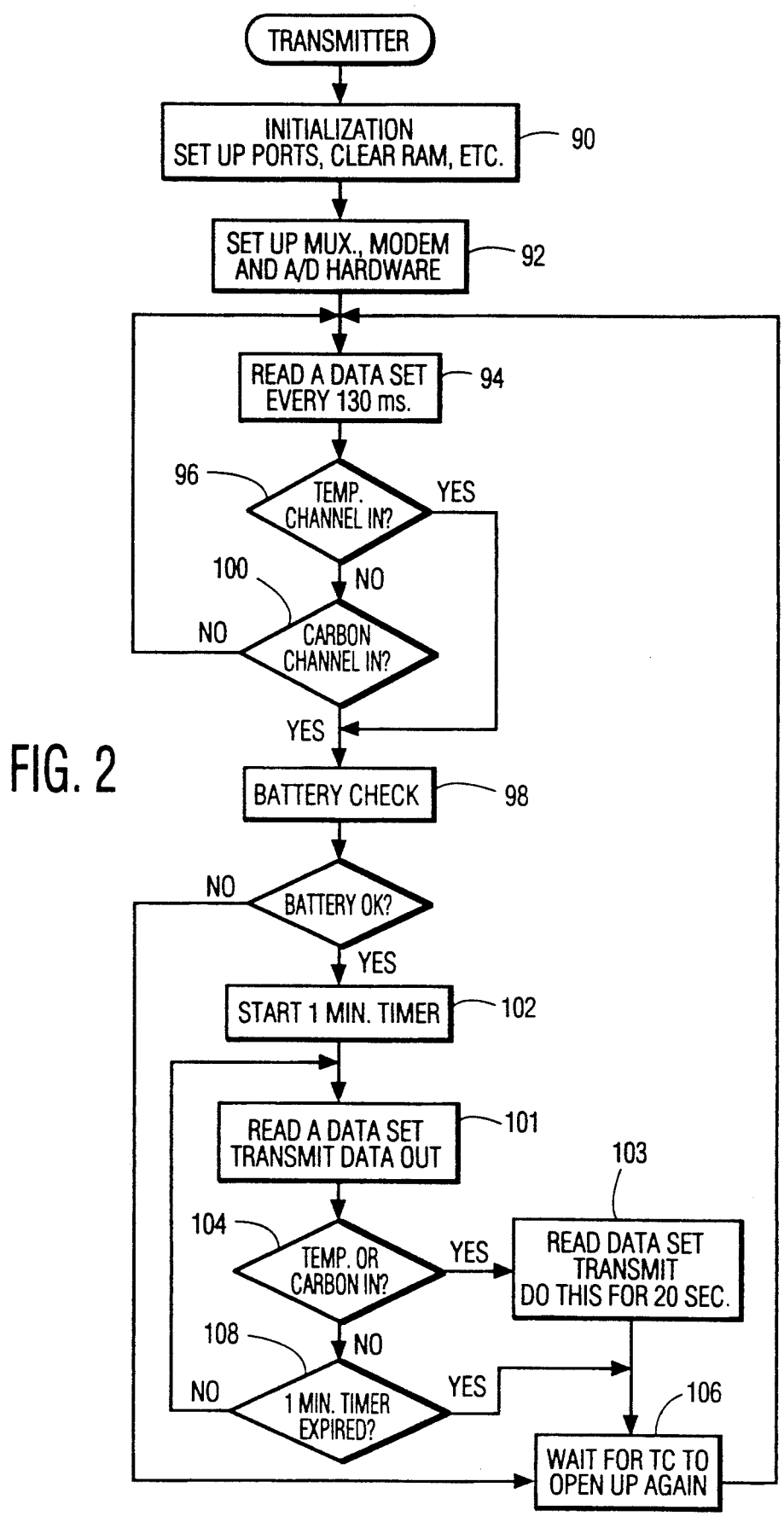
FIG. 2 is a fow diagram of the program for the microprocessor of the tranmitter assembly of FIG. 1.

FIG. 2 is a flow chart showing the steps in the programming of the tranmitter microprocessor 35. The first step, as shown in block 90, involves the initialization process which includes the setting up of the ports, the clearing of RAM, etc. This initialization step is followed by further initialization, in block 92, of the multiplexer, the modem, and the A/D hardware. The process then reads a different data set every 130 milliseconds by operation of the multiplexer as indicated in block 94. In the example described above, which used a Taptip, the two data sets would be the two thermocouples in the Taptip sensor. If the temperature channel is "in", that is if the sensor is in place, it will produce a lowering of the voltage on the inputs to the multiplexer. This occurs because the sensors are low impedance devices. If this question, as suggested in block 96, is answered "yes", the program proceeds to a battery check, as indicated in block 98. If the temperature channel is not "in" then a check is made to determine if the carbon channel is "in", in other words, if there is a lowering of the voltage on the thermocouple whose reading determines the magnitude of the liquidus arrest. This question is shown in block 100. If the answer to that question is "yes", then the battery check follows, otherwise the program proceeds back to block 94, the step involving reading a data set; for, if no temperature channel was detected and no carbon channel was detected, it is necessary to continue to read the data sets in sequence with the multiplexer until a primary element for one of the measurements is connected.

The subsequent parts of the program include the reading of a data set during a one minute delay, block 101, which is started after the battery check, block 102. Block 101 may include any necessary calculations which involve the ambient temperature, the ground potential. Also, block 101 may include the assignment of identifying bits to the signal from the primary elements as may be needed to identify which element is being read at a particular time. The transmitting of the value of the data set measurements then occurs, block 103, if the reading is identified by virtue of the range of its magnitude as either a temperature reading or a carbon reading, in accordance with block 104. A tranmission is made for a duration of 20 sec. and the transmitter is then shut off so that when the next measurements by the data sets are being made the transmitter will not insert noise into the measurement. Once the transmission is complete the program waits for the thermocouple being read to open up, as suggested by block 106, as an indication of a disconnection of unit 11, which determines that the program should now look for a new primary element to read.

It will be noted that if the answer to the question in block 104 is "no" then the one minute delay started by block 100 is checked to see if it has expired. If it has not, the data set is read again and transmission is then accomplished if the temperature and carbon signals are satisfactory. If the one minute timer has expired, then the program returns to scanning the data sets, block 94, if a disconnect has been sensed, block 106, for it is deemed adequate to allow one minute for a valid measurement to be produced once it is determined that a sensor is connected.

Figure 3:
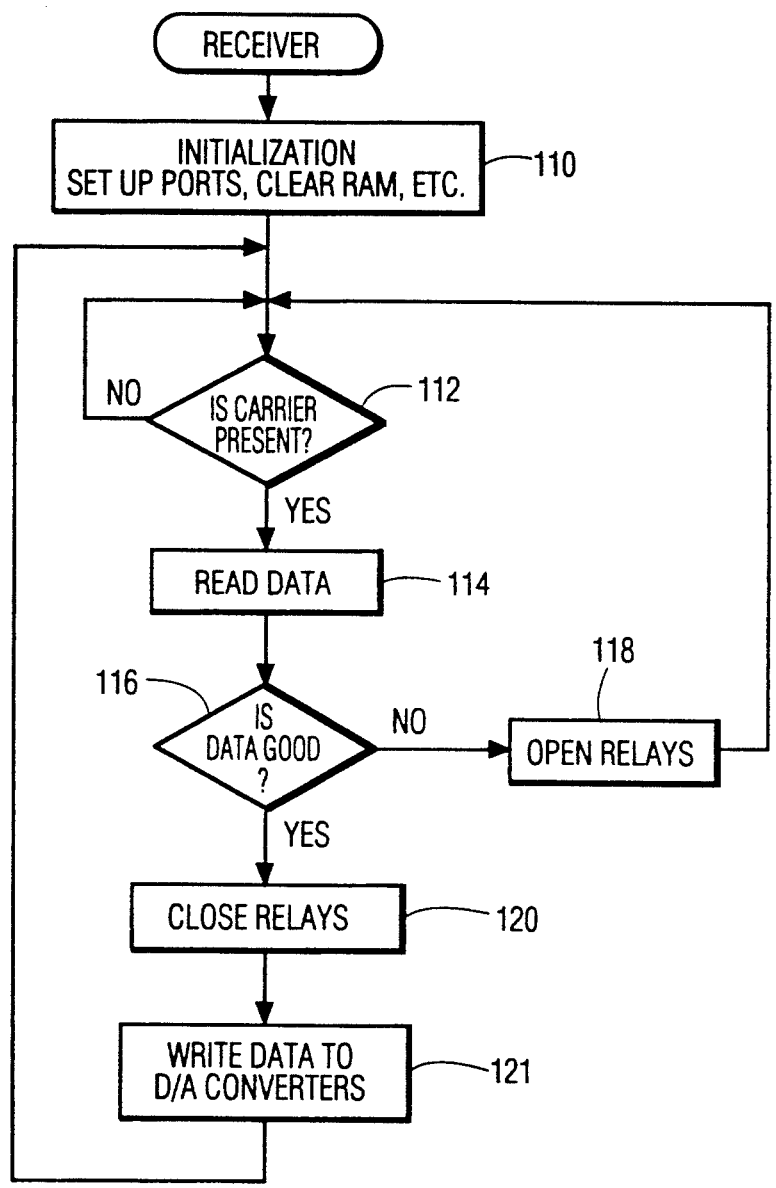
FIG. 3 is a flow diagram of the program for the microprocessor of the receiver assembly of FIG. 1.

FIG. 3 is a flow diagram of the program carried out by the receiver's microprocessor 48. It has as its initial step the initialization of the ports, the clearing of RAM and other necessary intialization functions which may be necessary. This is shown in block 110.

After the initialization step the program determines if there is a carrier present on the receiver input, block 112. If not then the program returns to examine for the carrier again.

If a carrier is detected then the data being received by the receiver is read, block 114. Reading the data is followed by a check to see if the data is good, block 116. This check includes the determination as to what the level of the signal is. Normally if the signal is below a certain level then there is a primary element connected. Also, at this point there is a determination as to which primary element is being read by the reading of the bits which identify the primary element.

If the data is not good then the relays 53a and 53b of FIG. 1 are opened, block 118, and the program looks for a carrier again.

If the data is good then the proper relay of the relays 53a and 53b is closed, block 120, and the data is written to the appropriate D/A converter, block 121, and the program returns to looking for a carrier.

All of the elements of the transmitting and receiving assemblies are known elements which are readily available in the market place. The sensors, likewise, can be any of a number of reasily available commercial sensors. For example, the sensors can be any one of the following commercial units available from Leeds & Northrup Metallurgical Products:

Temtip, Multitip or Diptip for measuring temperature;

Taptip for measuring temperature and %C;

Temp-O-Tip for measuring temperature and % oxygen;

Sublance for measuring temperature, %C, % oxygen, added aluminum content and manganese content.

Tectip K phase change detectors

The display units could be any of the following commercial units modified by the addition of a radio receiver assembly. These units are also available from Leeds & Northrup Metallurgical Products:

Steelab, a facility for rapidly determining and displaying the carbon and/or oxygen content of molten steel, the steel bath temperature, and the superheat temperature (difference between the bath temperature and liquidus temperature) of the molten steel.

Digilab, a device for rapidly determining the carbon, silicon and carbon equivalent of unalloyed cast iron as well as molten metal temperatures.

FIG. 3 shows an end view of the thermopile unit 26. This unit has a first plate 51, which may be of copper or aluminum. A second plate 52 is oriented parallel to the first plate. The second plate has a finned surface facing away from the first plate so that the second plate will act as a heat sink. Sandwiched between the two plates is the thermopile module 54, which consists of a number of thermocouples in series connection. This module interfaces each of the plates through a thermal grease so that good thermal contact is obtained.

Figure 4:
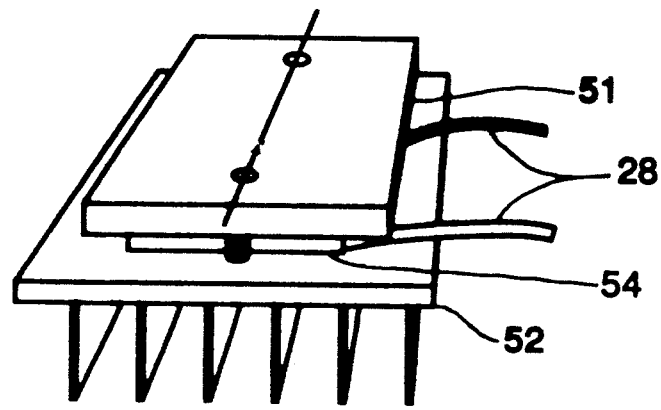
FIG. 4 is an end view of the structure of the thermopile element of FIG. 1.
Figure 5:
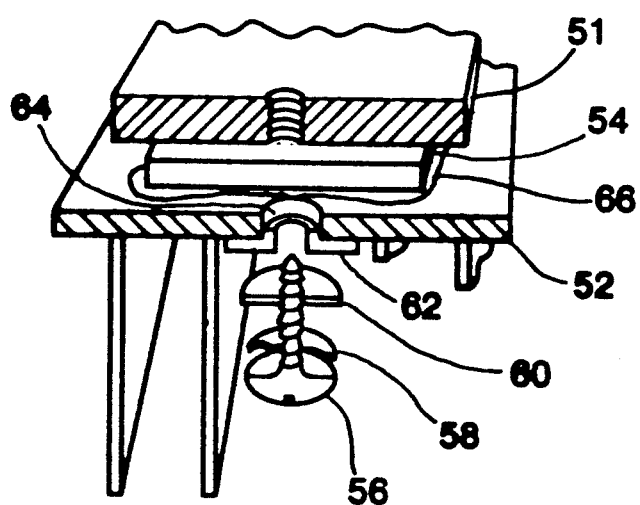
FIG. 5 is a diagram showing a cross sectioal view of the structure of the thermopile element of FIG. 1.

FIG. 4 shows the thermopile unit 26 of FIG. 3 in cross section so that the structure of the unit may be more readily understood. As is evident from the cross section, the plates are held together by means of stainless steel screws, such as screw 56, in conjunction with a Belleville or split lock washer 58 and a flat metal washer 60 with the screw being inserted through the fibre insulating washer 62 in clearance hole 64. As shown, the thermal grease 66 provides the intimate thermal contact needed between each of the plates and the thermopile module.

For proper operation, the thermopile unit should be position so that the plate 51 faces the molten metal and is located close to the molten metal during insertion of the sensor by positioning the lance 14 as shown in FIG. 1. The finned plate 52 then provides a heat sink effect, which will cause the plate 52 to be colder that plate 51. The thermopile module is then constructed so that the hot junctions are in contact with plate 51 through the thermal grease, which is sandwiched between the plate 51 and the module 54. The cold junctions of the thermopile module are arranged to be in contact with plate 52 by way of contact through the thermal grease sandwiched between plate 52 and the module. The difference in temperature between the hot and cold junctions will then produce a voltage at the output of the thermopile on the leads of cable 28 which will be used to provide the energy to recharge the batteries of the transmission assembly.

What is claimed is:

1. A system for obtaining real time measurements of a variable of a molten metal bath where the magnitude of the variable is measured by the immersion into the molten metal of a primary element for detecting said variable, and said primary element is an expendable device which plugs into the end of a lance for immersion into the molten metal and unplugs from the lance after the measurement is made and the lance is withdrawn from the molten metal, comprising
- a data transmitting assembly connected to receive the output of said primary element and operable to convert that output to a digital form and to transmit a radio signal indicative of the magnitude of said digital form only when the magnitude of said variable is within a predetermined range, which indicates that the primary element is plugged into said lance and that it is providing a valid reading;
- a data receiving assembly operable to receive said transmitted radio signal; and
- a display device responsive to the output of said data receiving assembly to display the magnitude of said variable.

2. A system as set forth in claim 1 in which there are a plurality of primary elements to measure a corresponding number of variables of the molten metal bath and
- said data transmitting assembly includes a multiplexer for scanning a plurality of said primary elements; and
- said receiving assembly includes a separate digital-to-analog converter for converting signals relating to each of said primary elements.

3. A system for obtaining real time measurements of a variable in molten metal processing, comprising;
- a sensor operable to detect the magnitude of said variable;
- a data transmitting assembly having
    - an analog to digital converter connected to the output of said sensor for converting the detected values of the associated variable to a digital form at the output of the converter,
    - a microprocessor connected to receive said digital form of said detected values and operable to output said values only if said values are within a range of values which would indicate that valid measurements were being made by said sensor, said microprocessor also being operable to time the operation of said transmitting assembly,
    - a frequency modulated very high frequency radio transmitter, and
    - a modulator responsive to the output of said microprocessor and operable to modulate the frequency of said transmitter in accordance with said output from said microprocessor;
- a data receiving assembly having
    - a frequency modulated very high frequency radio receiver responsive to signals from said transmitter,
    - a demodulator operable to demodulate the received signal,
    - a microprocessor responsive to the demodulated signal and operable to process said signal, and
    - a digital-to-analog converter operable to convert the digital signal output of the microprocessor to an analog signal; and
- a display connected to the output of said digital-to-analog converter for exhibiting the magnitude of said variable.

4. A system for obtaining real time measurements of a plurality of variables in molten metal processing, comprising;
- a plurality of sensors operable to detect the magnitude of those of said variables measuring said molten metal conditions; said sensors including a thermocouple having hot and cold junctions for measuring the temperature of said molten metal;
- a supplementary thermocouple sensor positioned to measure the ambient temperature in the region of the cold junction of said measuring thermocouple;
- a sensor for detecting the potential at a ground terminal;
- a data transmitting assembly having
    - a multiplexer for scanning said sensors,
    - an analog to digital converter connected to the output of said multiplexer for converting the outputs of the associated sensors to a digital form at the output of the converter,
    - a microprocessor connected to receive said digital form of said sensor outputs and operable to output said digital form only if the values of said outputs are within a range of values which would indicate that valid measurements were being made, said microprocessor also being operable to time the operation of said transmitting assembly and to make calculation of the temperature of the molten metal taking into account the cold junction temperature and the ground potential,
    - a frequency modulated very high frequency radio transmitter, and
    - a modulator responsive to the output of said microprocessor and operable to modulate the frequency of said transmitter in accordance with said output from said microprocessor;
- a data receiving assembly having
    - a frequency modulated very high frequency radio receiver responsive to signals from said transmitter,
    - a demodulator operable to demodulate the received signal,
    - a microprocessor responsive to the demodulated signal and operable to process said signal, and
    - a digital-to-analog converter operable to convert the digital signal output of the microprocessor to an analog signal; and
- a display connected to the output of said digital-to-analog converter for exhibiting the magnitudes of said variables.

* * * * *